(12) United States Patent
Sawaki et al.

(10) Patent No.: US 7,647,170 B2
(45) Date of Patent: Jan. 12, 2010

(54) NAVIGATION APPARATUS DISPLAYING VISUAL GUIDANCE

(75) Inventors: Masaru Sawaki, Niwa-gun (JP); Yoshinori Watanabe, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 8 days.

(21) Appl. No.: 12/219,447

(22) Filed: Jul. 22, 2008

(65) Prior Publication Data

US 2009/0030601 A1 Jan. 29, 2009

(30) Foreign Application Priority Data

Jul. 23, 2007 (JP) .............................. 2007-191099

(51) Int. Cl.
*G01C 21/30* (2006.01)
*G01C 21/00* (2006.01)
(52) U.S. Cl. .................................... 701/211; 340/995.2
(58) Field of Classification Search .................. 701/211; 340/995.2
See application file for complete search history.

(56) References Cited

U.S. PATENT DOCUMENTS

| | | | | |
|---|---|---|---|---|
| 5,323,321 | A * | 6/1994 | Smith, Jr. ..................... | 701/211 |
| 6,694,255 | B1 * | 2/2004 | Kainuma et al. ............ | 701/209 |
| 6,762,696 | B2 * | 7/2004 | Hulverscheidt et al. .. | 340/995.2 |
| 7,395,152 | B2 * | 7/2008 | Watanabe et al. ........... | 701/209 |
| 7,440,842 | B1 * | 10/2008 | Vorona ........................ | 701/117 |

| | | | | |
|---|---|---|---|---|
| 2002/0032524 | A1 * | 3/2002 | Hulverscheidt et al. ..... | 701/211 |
| 2004/0162672 | A1 * | 8/2004 | Kim ........................... | 701/209 |
| 2006/0271284 | A1 | 11/2006 | Watanabe et al. | |

FOREIGN PATENT DOCUMENTS

| | | |
|---|---|---|
| JP | A-6-147909 | 5/1994 |
| JP | A-09-042989 | 2/1997 |
| JP | A-11-325949 | 11/1999 |
| JP | A-2002-174527 | 6/2002 |
| JP | A-2006-284458 | 10/2006 |

OTHER PUBLICATIONS

Office Action dated May 26, 2009 from the Japan Patent Office in the corresponding JP Application No. 2007-191099 (and English Translation).

* cited by examiner

*Primary Examiner*—Khoi Tran
*Assistant Examiner*—Brian J Broadhead
(74) *Attorney, Agent, or Firm*—Posz Law Group, PLC

(57) ABSTRACT

A navigation apparatus for a vehicle displays, based on map information, a map image for vicinity of a present position of the vehicle and a guidance route in superimposition in a display device. An end point relative to a moving arrow is defined as being a predetermined first distance ahead of the present position along the route; a start point is defined as being a predetermined second distance smaller than the first distance ahead of the present position along the route. The navigation apparatus is further configured to superimpose, on the displayed route, the moving arrow which includes an arrowhead and a line between the arrowhead and the present position, such that the arrowhead moves from the start point to the end point along the route when a distance to a nearest guidance point is smaller than a predetermined distance.

10 Claims, 3 Drawing Sheets

NAVIGATION APPARATUS DISPLAYING VISUAL GUIDANCE

CROSS REFERENCE TO RELATED APPLICATION

This application is based on and incorporates herein by reference Japanese Patent Application No. 2007-191099 filed on Jul. 23, 2007.

FIELD OF THE INVENTION

The present invention relates to an in-vehicle navigation apparatus to navigate the vehicle along a route to a destination using an image display.

BACKGROUND OF THE INVENTION

A conventional navigation apparatus has a function to synthetically display a map in vicinity of a present position and a travel route to a destination.

In addition, the navigation apparatus further displays an arrow expressing an intended heading direction at a guidance point such as an intersection to be turned (for example, Patent document 1). This allows a user to recognize the present position and the direction of the travel route without need of moving a line of sight.

Patent document 1: JP-2006-313144A

In Patent document 1, when the vehicle approaches a predetermined distance (for example, 700 meters) short of the guidance point such as an intersection, the arrow expressing the intended heading direction suddenly appears on a display screen. This may provide a user with a difficulty in quickly understanding the direction of the arrow.

SUMMARY OF THE INVENTION

It is an object to provide a navigation apparatus to enable a driver to easily recognize a vehicle's heading direction illustrated by an arrow.

According to an example of the present invention, a navigation apparatus for a vehicle is provided as follows. An indicating means is configured to include a display portion for displaying an image. A map information acquiring means is configured to acquire map information. A present position designating means is configured to designate a present position of the vehicle. A route acquiring means is configured to acquire a route to a destination. A navigating means is configured to display, based on the acquired map information, a map image of a vicinity of the designated present position and the acquired route in superimposition in the display portion. Herein, when a guidance point distance between the present position and a predetermined guidance point is smaller than a predetermined arrow display start distance, the navigating means is further configured to superimpose, on the displayed route, a moving arrow which includes an arrowhead and a line between the arrowhead and the present position such that the arrowhead moves from a start point to an end point along the route. Here, the end point is defined as being a predetermined first distance ahead of the present position along the route; the start point is defined as being a predetermined second distance smaller than the first distance ahead of the present position along the route.

According to another example of the present invention, a method for navigating a vehicle is provided as comprising: (i) displaying, based on map information, a map image of a vicinity of a present position of the vehicle and a guidance route in superimposition in a display device; (ii) defining an end point relative to a moving arrow as being a predetermined first distance ahead of the present position along the guidance route; (iii) defining a start point relative to the moving arrow as being a predetermined second distance smaller than the first distance ahead of the present position along the guidance route; and (iv) superimposing, on the displayed guidance route, the moving arrow which includes an arrowhead and a line between the arrowhead and the present position, such as the arrowhead moves from the start point to the end point along the guidance route when a guidance point distance between the present position and a predetermined guidance point is smaller than a predetermined arrow display start distance.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
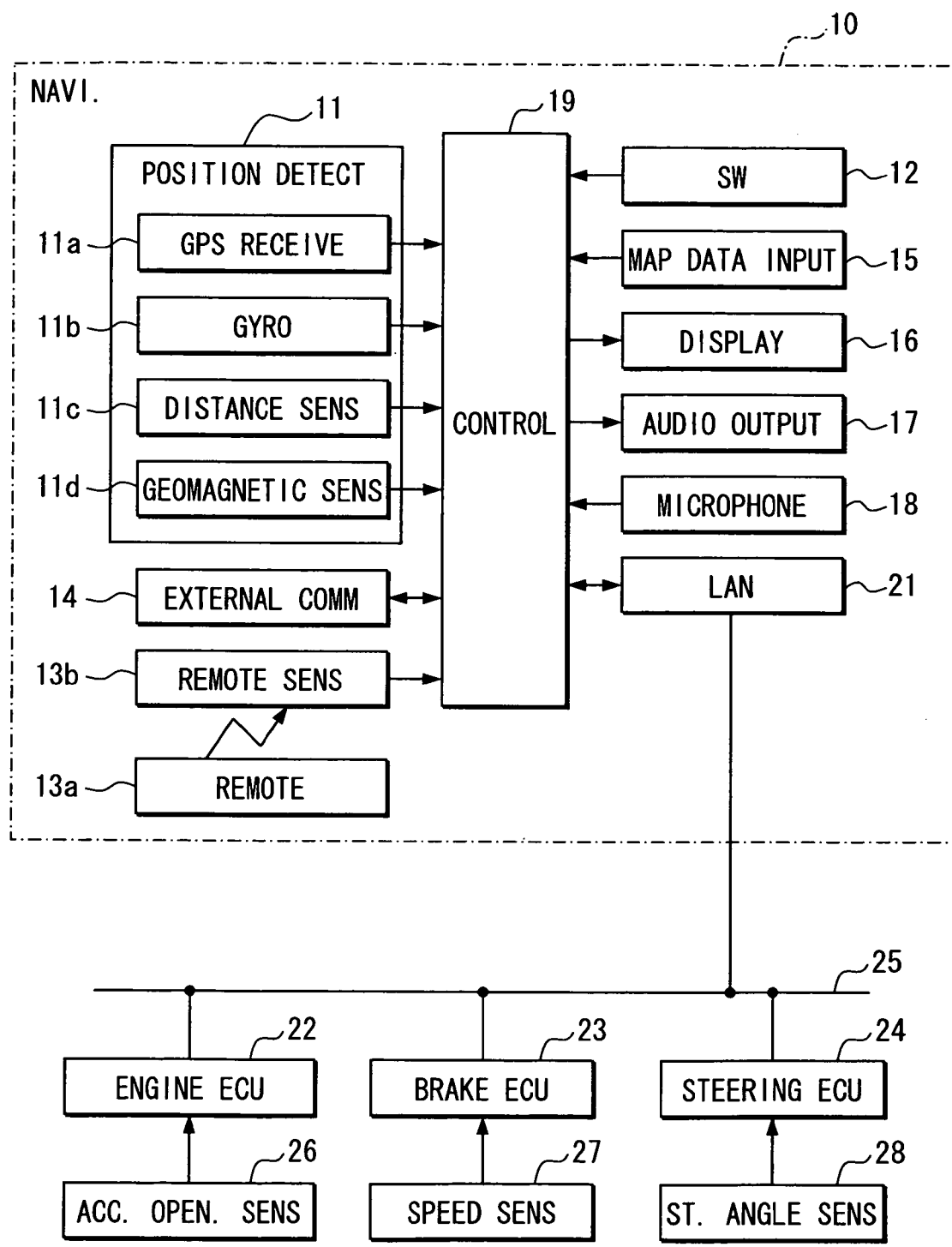
FIG. 1 is a block diagram illustrating an overall configuration of a navigation apparatus and related in-vehicle devices according to an embodiment of the present invention.

Hereafter, description will be given to a navigation apparatus as a route guidance apparatus according to an embodiment of the present invention with reference to the drawings. FIG. 1 is a block diagram illustrating an overall configuration of a navigation apparatus 10 and in-vehicle LAN (Local Area Network) 25 connected to the navigation apparatus 10. As illustrated in FIG. 1, the navigation apparatus 10 is mounted in a subject vehicle and connected with various in-vehicle ECUs (Electronic Control Units) and the like including an engine ECU 22, a brake ECU 23, and a steering ECU 24 via the in-vehicle LAN 25.

The engine ECU 22 controls a rotation of an engine based on detection signals from an accelerator opening sensor 26 for detecting an accelerator opening based on a stepping amount of an accelerator by a driver. The brake ECU 23 executes an ABS (Antilock Brake System) control, a traction control, etc., based on detection signals from a speed sensor 27 for detecting a vehicle speed or a master cylinder pressure sensor for detecting an amount of brake operation from an oil pressure of a master cylinder, which pressure-feeds brake oil according to a driver's brake pedal operation. The steering ECU 24 executes a power steering control, which generates an assist force when the steering wheel changes an angle, based on detection signals from a steering angle sensor 28 for detecting a steering angle of the steering wheel due to an operation of the driver.

The various vehicle-related information such as an accelerator opening, an amount of brake operation, and a vehicle speed are transmitted and received as needed between the ECUs 22 to 24 via the in-vehicle LAN 25.

The in-vehicle navigation apparatus 10 includes the following: a position detection device 11 for detecting a present position of the vehicle; an operation switch group 12 for a user to input various instructions; a remote control terminal 13a provided as a different body unit from the navigation apparatus 10 for inputting various instructions from a user like the operation switch group 12; a remote control sensor 13b for inputting a signal from the remote control terminal 13a; an external communication device 14 connected with a packet communication network etc for communicating with an outside; a map data input device 15 for inputting data from a map storage medium recording map data and other information; a display device 16 as a display portion for displaying a map or a variety of information; an audio output device 17 for outputting various kinds of guidance message sounds; a microphone 18 for outputting an electric signal based on a sound uttered by a user; an in-vehicle LAN communication device 21 which exchanges various vehicle-related information, etc. with another in-vehicle apparatus or device via the in-vehicle LAN 25; and a control device 19. The control device 19 executes various processes according to inputs from the position detection device 11, the operation switch group 12, the remote control sensor 13b, the map data input device 15, the microphone 18, and the in-vehicle LAN communication device 21, while controlling the display device 16, the audio output device 17, and the in-vehicle LAN communication device 21.

The position detection device 11 includes the following: a GPS receiver 11a which receives via a GPS antenna (not shown) electric waves from satellites for GPS (Global Positioning System) and outputs reception signals; a gyroscope 11b for detecting rotational movement exerted to the vehicle; a distance sensor 11c for detecting a travel distance from an acceleration in a length direction of the vehicle; and a geomagnetic sensor 11d for detecting a heading direction from earth magnetism. Based on signals outputted from sensors or the like 11a to 11d, the control device 19 calculates a position, direction, speed, etc. of the vehicle.

In addition, although there are several methods to calculate a present position based on a signal outputted from the GPS receiver 21a, an independent positioning method or a relative positioning method (D-GPS, interference positioning) may be used. In particular, an RTK-GPS (Real Time Kinematics Global Positioning System) is used as the interference positioning system.

The operation switch group 12 includes a touch panel integrated in a display screen or surface of the display device 16 and a mechanical key switch arranged in the periphery of the display device 16. The touch panel is laminated over the display device 16. In addition, although the touch panel includes various types to detect a user's manipulation such as a pressure-sensitive type, an electromagnetic induction type, a capacitive sensing type, or a type combining the foregoing, any type may be used in the present embodiment.

The external communication device 14 executes transmission and reception of data with a reference base station of GPS via an external packet communications network (when the RTK-GPS is used). The map data input device 15 is used for inputting various data stored in a map data storage medium (unshown). The map data storage medium stores map data, audio data for guidance, voice recognition data, etc. The map data includes node data, link data, cost data, background data, road data, topographical data, name data, mark data, intersection data, facility data, etc. Such a storage medium is a CD-ROM, DVD-ROM, hard disk drive, or a memory card.

The display device 16 has a color display screen and can be a liquid crystal display, an organic electroluminescence display, or a CRT, or the like. The display screen of the display device 16 displays a map image based on the map data inputted from the map data input device 15. In superimposition to the map image, the display screen further displays additional images such as a mark indicating a present position of the vehicle detected by the position detection device 11, a guidance route (or guided route) to a destination, a name, a landmark, a facility mark.

The audio output device 17 can output various guidance or a guidance message sound of a facility inputted from the map data input device 15. The microphone 18 outputs electric signal (sound signal) based on sound inputted to the control device 19, when a user inputs utterance (i.e., speech). The navigation apparatus 10 can be operated based on audio instructions inputted via the microphone 18.

The in-vehicle LAN communication device 21 communicates with various apparatuses (engine ECU 22 etc.) via the in-vehicle LAN 25. The control device 19 includes a known microcomputer having a CPU, ROM, RAM, SRAM, I/O, and a bus line connecting the foregoing. The control device 19 executes various processes based on programs stored in the ROM or RAM. For instance, the control device 19 performs a peripheral map display process, a route calculation process, and a route guidance process (also called "navigation process").

The peripheral map display process performs the following: calculating a present position of the vehicle as a set of a coordinate and a heading direction based on each detection signal from the position detection device 11; and displaying, in the display device 16, a map or map image near the present position, vehicle mark, etc. based on the map data from the map data input device 15.

The route calculation process performs the following: designating a destination based on the map data from the map data input device 15 according to an input via the operation switch group 12 or remote control terminal 13a; and calculating an optimal route from the present position to the designated destination based on the map data from the map data input device 15.

The route guidance process performs navigating or route guidance by displaying the calculated route (referred to as "travel route") in the display device 16 and/or by outputting a corresponding audio guidance message via the audio output device 17. Further, the route guidance process performs calculating a point required for navigation or guidance (referred to as "guidance point") from the result of the above route calculation process based on the map data such as road configuration data, intersection positional information, crossing positional information; or determining what kind of guidance or navigation is required (e.g., instructions of whether to turn to the right or left).

Figure 2:
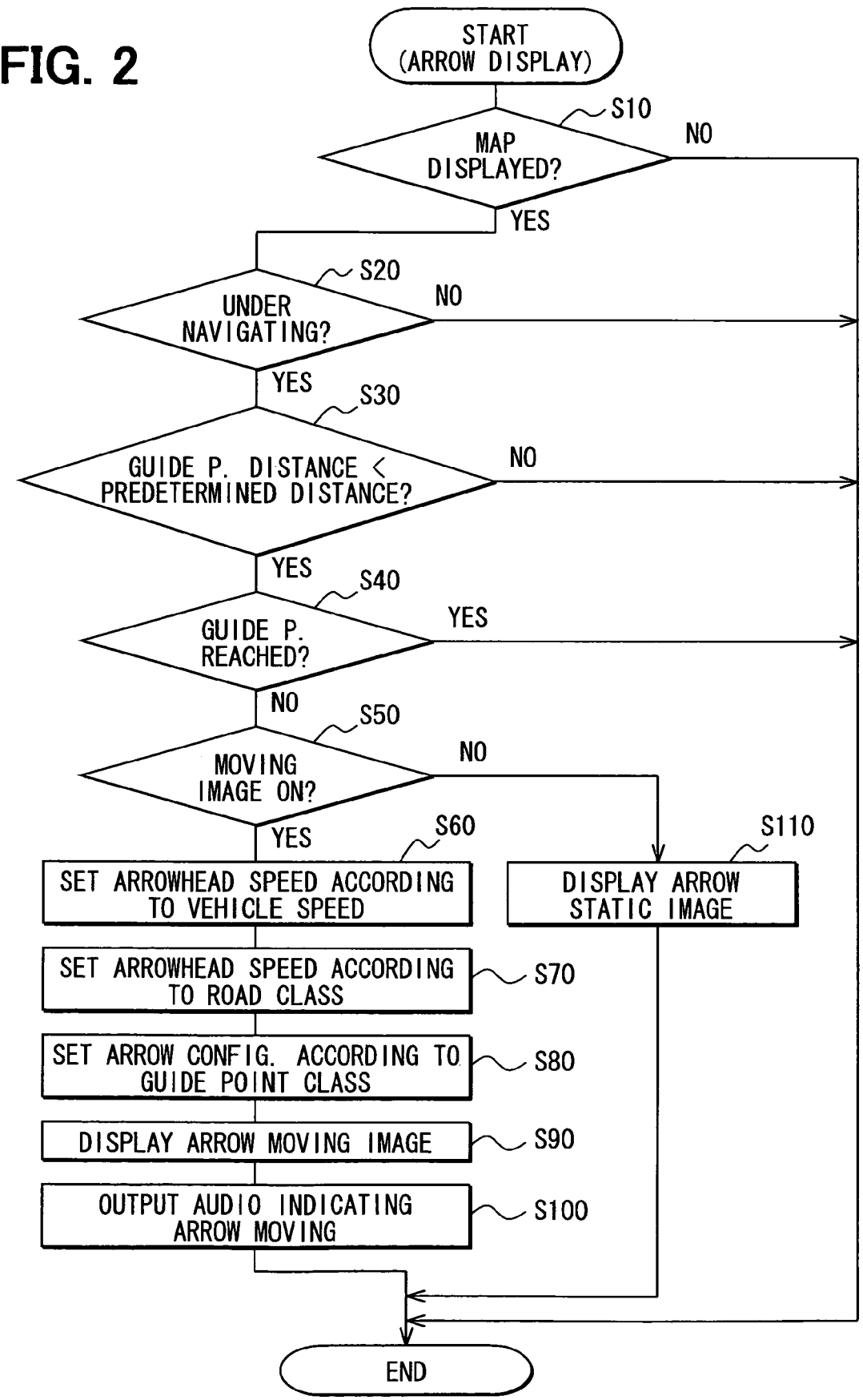
FIG. 2 is a flowchart illustrating an arrow display process.
Figure 3:
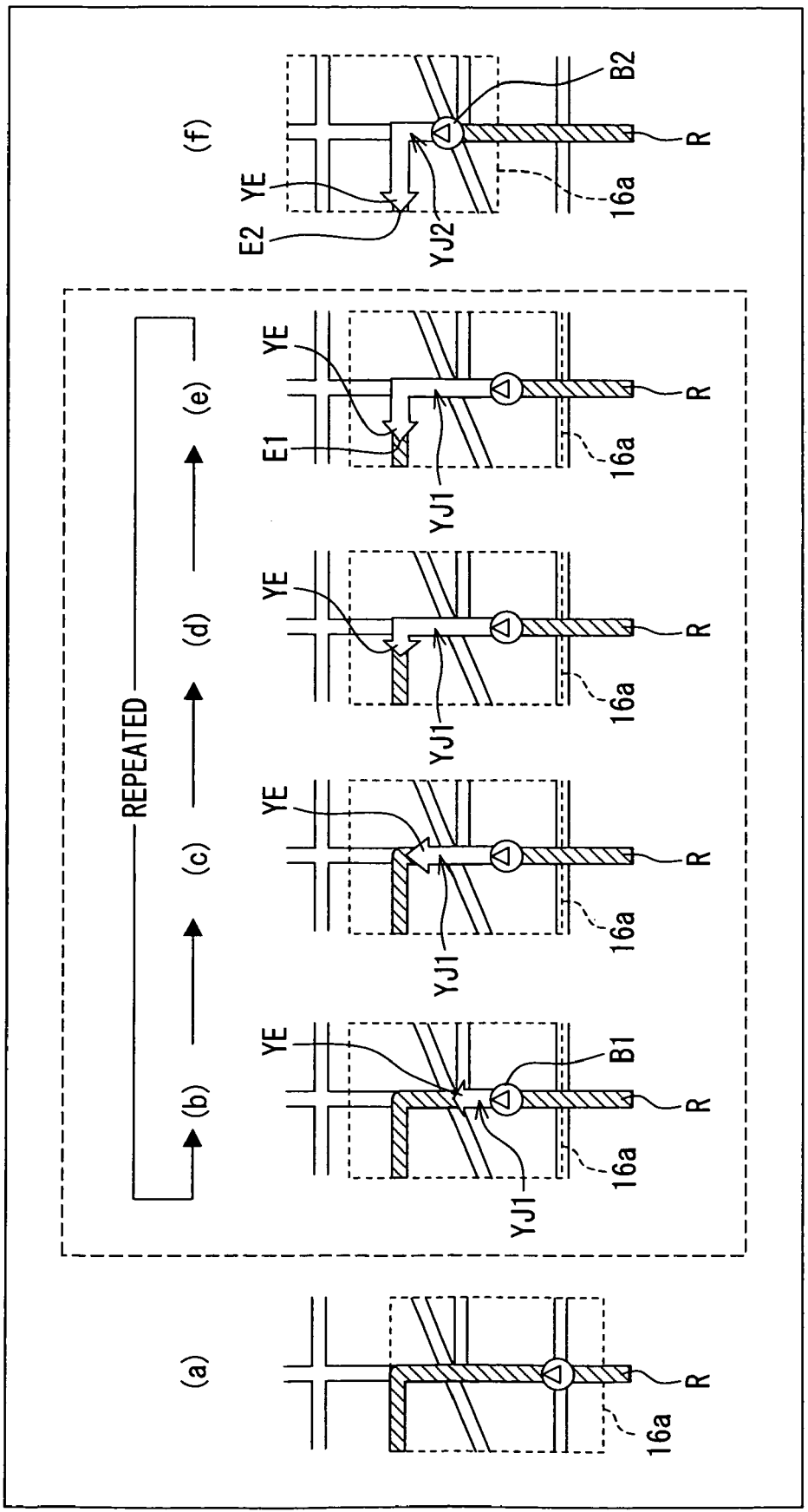
FIGS. 3A to 3F are diagrams for explaining a display method of an arrow.

In addition, the control device 19 executes an arrow display process for displaying an arrow, which illustrates a heading direction, in superimposition on the travel route. Here, a procedure of the arrow display process by the control device 19 is explained using FIG. 2 and FIG. 3. FIG. 2 is a flowchart which illustrates the arrow display process. FIG. 3 illustrates a display method of the arrow.

This arrow display process is repeatedly executed while the control device 19 operates (with power turned on). When the arrow display process is started, the control device 19 determines whether a peripheral map relative to the present position is displayed in the display device 16 at S10. When a peripheral map is not under display (S10: NO), the arrow display process is once ended.

In contrast, when a peripheral map relative to the present position is under display (S10: YES), it is determined at S20 whether route guidance (or navigating) is under operation. When route guidance is not under operation (S20: NO), the arrow display process is once ended. In contrast, when route guidance is under operation (S20: YES), it is determined at S30 whether a guidance point distance is smaller than a first arrow display start distance. Herein, the guidance point distance is defined as a distance from a present position to a guidance point nearest to the present position; the first arrow display start distance is defined as a predetermined distance, for instance, 700 meters.

When the guidance point distance is not smaller than the first arrow display start distance (S30: NO), the arrow display process is once ended. In contrast, when the guidance point distance is smaller than the first arrow display start distance (S30: YES), it is determined at S40 whether the vehicle reaches the nearest guidance point. When the vehicle reaches the nearest guidance point (S40: YES), the arrow display process is once ended. In contrast, when the vehicle does not reach the nearest guidance point (S40: NO), it is determined at S50 whether a moving image display setting relative to an arrow is turned ON.

The moving image display setting relative to an arrow is to set either a moving image (see S90 below) or static image (see S110 below) with respect to display of an arrow. When the display of an arrow is using a moving image, a moving image setting is turned ON; When the display of an arrow is using a static image, a moving image setting is turned OFF. The setting is executed when a user operates the operation switch group 12 or the like.

When the moving image setting is turned ON (S50: Yes), speed information indicating a travel speed of the vehicle is received via the in-vehicle LAN communication device 21 from the engine ECU 22 at S60. Based on the travel speed indicated by the received speed information, the moving speed of the arrowhead of the arrow is determined or set. For instance, as the travel speed increases, the moving speed of the arrowhead increases.

At S70, the road class of a road (referred to as "travel road"), which the vehicle presently travels, is distinguished based on the road data contained in the map data; the moving speed of the arrowhead is set according to the road class of the travel road. In the present embodiment, the moving speed of the arrowhead of the arrow is set to be higher in an expressway than in a general road.

Furthermore at S80, the display configuration of the arrow is determined or set according to individual classes (intersection, destination, tollgate, warning point, etc.) of the nearest guidance point based on road data, topographical data, intersection data, facility data, etc. which are contained in the map data. In the present embodiment, when the guidance points are an intersection, a destination, and a tollgate, the corresponding arrows are displayed in red, blue, and yellow, respectively for example; when the guidance point is a warning point such as a crossing, the arrow is displayed in blinking.

At S90, an arrow YJ1 is displayed in the display device 16 such that an arrowhead YE moves along the travel route R from a present position as a first start point B1 (in (b) of FIG. 3) toward a first end point E1 (in (e) of FIG. 3), which is a predetermined first arrow end point distance (e.g., 900 meters) ahead of the present position, based on the moving speed and display configuration set at S60 to S80. This is illustrated in (b) to (e) in FIG. 3. The display sequence of (b) to (e) in FIG. 3 is repeated.

In addition, FIG. 3 illustrates the movement of the arrowhead YE in a time-based order of (a)->(b)->(c)->(d)->(e)->(f). The time lapse from (a) to (b) is about 3 seconds, from (b) to (e) is about 0.5 second, and from (e) to (f) is about 3 seconds in the present embodiment, for instance. In addition, the rectangular frame 16a surrounded with broken lines in FIG. 3 expresses the display screen in the display device 16.

In (a) of FIG. 3, the guidance point distance is greater than the arrow display start distance; therefore, an arrow is not displayed. In (b), the guidance point distance is smaller than the arrow display start distance; thereby, displaying an arrow (or moving arrow) is started and the display sequence (b) to (e) is repeated.

Furthermore, when the guidance point distance is smaller than a predetermined second arrow display start distance (e.g., 300 meters) smaller than the first arrow display start distance (e.g., 700 meters), an arrow YJ2 is repeatedly displayed in the display device 16 such that its arrowhead YE moves along the travel route R toward a second end point E2 a predetermined second arrow end point distance (e.g., 500 meters) ahead from a present position as a second start point B2, as shown in (f) of FIG. 3.

Thereafter at S100, audio information (e.g., sounding like "whoosh") is outputted to express the movement of the arrowhead YE via the audio output device 17. Then, the arrow display process is once ended.

In addition, when the moving image display setting is turned OFF (S50: NO), a static image of the arrow is displayed in the display device 16 at S110 such that the arrow is along the travel route R from a present position as a start point to an end point, which is the predetermined first arrow end point distance ahead of the present position, with the arrowhead located at the end point. The arrow display process is then once ended.

In the navigation apparatus 10 according to the embodiment, when the guidance point distance, which is between the present position and the nearest guidance point, becomes smaller than the first (second) arrow display start distance, an arrow YJ1 (YJ2) is displayed in superimposition to the travel route R on the map image (S90). Herein, the arrow YJ1 (YJ2) includes an arrowhead YE and a line between the arrowhead YE and the present position. Further the arrowhead YE of the arrow YJ1 (YJ2) moves from a present position as the start point B1 (B2) toward the end point E1 (E2) the first arrow end point distance (the second arrow end point distance) ahead of the present position.

Such a display of the moving arrow (or a display of the moving image of the arrow) allows the user to intuitively recognize the direction indicated by the arrow in comparison with the display of the static image of the arrow. In addition, the navigation apparatus 10 repeatedly displays the arrow YJ1 including the arrowhead YE moving toward the first end point E1, or the arrow YJ2 including the arrowhead YE moving toward the second end point E2, until the vehicle reaches the nearest guidance point. In other words, the display of the arrow YJ1 or YJ2 having the moving arrowhead YE is repeated two or more times. In comparison to only one time display of the arrow YJ1 or YJ2, the occurrence of the driver's overlooking the moving arrow can be reduced accordingly.

In addition, the navigation apparatus 10 outputs the sound (e.g., "Whoosh") indicating the movement of the arrowhead YE of the arrow YJ1 toward the end point E1, when the arrow YJ1 is displayed (S100). Such a sound can rouse the driver and reduce the occurrence of the driver's overlooking the display of the arrow YJ1.

In addition, the navigation apparatus 10 displays the arrow YJ1 and YJ2 according to the travel speed detected by the speed sensor 27 so that as the travel speed becomes greater, the moving speed of the arrowhead YE becomes greater (S60, S90). Such a configuration allows the driver to intuitively recognize the speed of the vehicle with the help of the speed of the moving arrowhead YE. That is, the driver can intuitively understand whether the time taken for the vehicle to reach the nearest guidance point from the present position is short or long.

In addition, the navigation apparatus 10 distinguishes the class of a road under travel based on the road data contained in the map data to thereby change the moving speed of the arrowhead YE according to the distinguished road class with respect to the display of the arrow YJ1 or YJ2 (S70, S90). Such a configuration allows the driver to intuitively recognize the road class of the travel road the vehicle travels based on the speed of the moving arrowhead YE.

Furthermore, at S80, S90, the navigation apparatus 10 displays the arrow YJ1, YJ2, by changing the display configuration according to individual classes (intersection, destination, tollgate, warning point, etc.) of the nearest guidance point based on road data, topographical data, intersection data, facility data, etc. which are contained in the map data. The driver can thus understand the class of the nearest guidance point by the display configuration of the arrow YJ1, YJ2.

When the display device 16 changes the display into the peripheral map image relative to the present position from another image (S10), the guidance point distance may be already smaller than the first arrow display start distance (S30: YES). In such a case, the arrow YJ1, YJ2 is displayed in superimposition to the map image immediately when the display is changed to the peripheral map (S90). When the guidance point distance becomes smaller than the first arrow display start distance, another image other than the peripheral map may be displayed, disabling the display of the arrow YJ1, YJ2. Even in such a case, the arrow YJ1, YJ2 can be displayed when the peripheral map image relative to the present position is displayed thereafter. This helps prevent not displaying of the arrow YJ1, YJ2 even though the vehicle approaches the nearest guidance point.

In addition, the navigation apparatus 10 does not display the arrow YJ1, YJ2 when the arrow moving image setting is set to OFF by an operation via the operation switch group 12 (S50: NO). The driver can thus determine whether to display the arrow YJ1, YJ2.

The navigation apparatus 10 functions as an example of a route guidance apparatus. The display device 16 and the route guidance process executed by the control device 19 function as an example of an indicating means or control unit. The map data input device 15 functions as an example of a map information acquiring means or device. The position detection device 11 functions as an example of a present position designating means or device. The route calculation process executed by the control device 19 functions as an example of a route acquiring means or control unit. The processing at S90 by the control device 19 functions as an example of a navigating means or control unit, or a moving arrow superimposing means or control unit. The processing at S100 executed by the control device 19 functions as an example of an audio arrow indicating means or control unit. The speed sensor 27 functions as an example of a speed detecting means or device. The processing at S70 executed by the control device 19 functions as an example of a road class distinguishing means or control unit. The processing at S80 executed by the control device 19 functions as an example of a guidance point class distinguishing means or control unit. The operation switch group 12 functions as an example of a display instruction acquiring means or device. The processing at S50 executed by the control device 19 functions as an example of an arrow display prohibiting means or control unit.

Although the embodiment is described above, the present invention is not limited to the above embodiment and can be modified. For example, the start point of the moving arrowhead YE is set to the present position. Alternatively, a start point of the moving arrowhead YE can be modified, for example, to be set to a point a predetermined second distance ahead of the present position, while an end point of the moving arrowhead YE is set to a point a predetermined first distance ahead of the present position, the predetermined first distance being naturally longer than the predetermined second distance. (Herein, if the predetermined second distance is set to zero (0), it means that the start point is equivalent to the present position, which is the same as in the above embodiment.) In other words, the arrowhead YE starts from the point, which is closer to the end point E1 or E2 than the present position is. If the moving speed of the arrowhead YE is the same, time required for the arrowhead YE to arrive at the end point E1 (E2) can be shortened rather than the case where the arrowhead YE starts movement from the present position. The driver can thus grasp the heading direction of the vehicle at an earlier stage.

In addition, in the above embodiment, the display of the arrow YJ1, YJ2 is repeated until arrival to the nearest guidance point. Alternatively, the repetition times can be limited to predetermined times, and then displaying of the arrow YJ1, YJ2 may be ended. Further, after the display is repeated the predetermined times, a re-display instruction to instruct the navigation apparatus 10 to re-display the arrow YJ1, YJ2 can be designed based on a user's operation via the operation switch group 12. Even if having overlooked the display of the arrow YJ1, YJ2, a driver can confirm the display of the arrow YJ1, YJ2 using the re-display instruction. Herein, the operation switch group 12 functions as an example of a re-display instruction acquiring means or device.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, a navigation apparatus for a vehicle is provided as follows. An indicating means is configured to include a display portion for displaying an image. A map information acquiring means is configured to acquire map information. A present position designating means is configured to designate a present position of the vehicle. A route acquiring means is configured to acquire a route to a destination. A navigating means is configured to display, based on the acquired map information, a map image of a vicinity of the designated present position and the acquired route in superimposition in the display portion. Herein, when a guidance point distance between the present position and a predetermined guidance point is smaller than a predetermined arrow display start distance, the navigating means is further configured to superimpose, on the displayed route, a moving arrow which includes an arrowhead and a line between the arrowhead and the present position such that the arrowhead moves from a start point to an end point along the route. Here, the end point is defined as being a predetermined first distance ahead of the present position along the route; the start point is defined as being a predetermined second distance smaller than the first distance ahead of the present position along the route.

That is, the moving arrow is displayed such that the arrowhead moves toward the end point ahead of the present position from the start point closer to the present position. Such a display for the moving arrow allows a user or driver to intuitively recognize the direction indicated by the moving arrow in comparison with the display for the static arrow.

As an optional aspect of the navigation apparatus, the navigating means may be configured to repeat displaying the moving arrow multiple times. Such repeated displaying operations can help prevent a user from overlooking the display of the moving arrow in comparison with only one-time displaying operation. In other words, the repeated displaying operations can reduce the probability of occurrence of the user's overlooking the display of the moving arrow.

As an optional aspect of the navigation apparatus, an audio arrow indicating means may be further included for outputting audio information expressing that the arrowhead moves toward the end point when the moving arrow is displayed. Herein, the outputted audio information may sound like "Whoosh," for example. Such sounding the audio information can help prevent a user from overlooking the display of the moving arrow in comparison with only displaying the moving arrow.

As an optional aspect of the navigation apparatus, a speed detecting means may be further included for detecting a speed of the vehicle. Herein, the navigating means may be configured to increase a speed of the moving arrowhead as the detected speed of the vehicle increases. Such a configuration allows a user to intuitively recognize the speed of the vehicle based on the speed of the moving arrowhead. That is, the driver can intuitively understand whether time taken for the vehicle to arrive at the predetermined guidance point from the present position is short or long.

As an optional aspect of the navigation apparatus, a road class distinguishing means may be further included for distinguishing a road class of a road the vehicle travels based on road class information, which is included in the acquired map information. Herein, the navigating means may be configured to change a speed of the moving arrowhead based on the distinguished road class. Such a configuration allows a user to intuitively recognize the road class of the road the vehicle travels based on the speed of the moving arrowhead. For example, the arrowhead moves faster in traveling a highway than in traveling a general road.

As an optional aspect of the navigation apparatus, a guidance point class distinguishing means may be further included for distinguishing a guidance point class of the predetermined guidance point based on guidance point class information, which is included in the acquired map information. Herein, the navigating means may be configured to change a display configuration for the moving arrow based on the distinguished guidance point class. Such a configuration allows a user to intuitively recognize the class of the guidance point based on the display configuration of the moving arrow. For example, the color of the moving arrow is changed by determining whether the guidance point is an intersection, a destination, or a tollgate. When the guidance point is a warning requiring point such as a crossing, the moving arrow can be blinked in the display screen.

As an optional aspect of the navigation apparatus, a re-display instruction acquiring means may be further included for acquiring a re-display instruction for demanding a re-display of the moving arrow. Herein, when the re-display instruction is acquired before the vehicle passes through the predetermined guidance point after displaying the moving arrow is completed, the navigating means may be configured to re-display the moving arrow. Reconfirming the display of the moving arrow can be possible even if a user overlooks it.

As an optional aspect of the navigation apparatus, if the guidance point distance is smaller than the arrow display start distance when a display of the display device is changed into the map image of the vicinity of the present position from another image other than the map image of the vicinity of the present position, the navigating means may be configured to display the moving arrow. When the guidance point distance reaches the arrow display start distance, the display portion may display another image other than the map in vicinity of the present position, preventing a moving arrow from being displayed. Even in such a case, the moving arrow can be displayed or superimposed if the map in vicinity of the present position is displayed. This helps prevent not displaying of a moving arrow even though the vehicle approaches the guidance point.

As an optional aspect of the navigation apparatus, a display instruction acquiring means may be further included for acquiring an arrow display selection instruction for indicating whether to allow displaying the moving arrow; and an arrow display prohibiting means may be further included for prohibiting the navigating means from displaying the moving arrow when the acquired instruction indicates that displaying the moving arrow is not allowed. Such a configuration allows a user to select whether to display a moving arrow or not.

As another aspect of the disclosure, a method is provided for controlling the above navigation apparatus.

It will be obvious to those skilled in the art that various changes may be made in the above-described embodiments of the present invention. However, the scope of the present invention should be determined by the following claims.

What is claimed is:

1. A navigation apparatus for a vehicle, comprising:
   an indicating means including a display portion for displaying an image;
   a map information acquiring means for acquiring map information;
   a present position designating means for designating a present position of the vehicle;
   a route acquiring means for acquiring a route to a destination; and
   a navigating means for displaying, based on the acquired map information, a map image of a vicinity of the designated present position and the acquired route in superimposition in the display portion,
   wherein when a guidance point distance between the present position and a predetermined guidance point is smaller than a predetermined arrow display start distance, the navigating means is configured to superimpose, on the displayed route, a moving arrow which includes an arrowhead and a line between the arrowhead and the present position, the arrowhead moving from a start point to an end point along the route, the end point being a predetermined first distance ahead of the present position along the route, the start point being a predetermined second distance smaller than the first distance ahead of the present position along the route.

2. The navigation apparatus according to claim 1, wherein the navigating means is configured to repeat displaying the moving arrow multiple times.

3. The navigation apparatus according to claim 1, further comprising:

an audio arrow indicating means for outputting audio information expressing that the arrowhead moves toward the end point when the moving arrow is displayed.

4. The navigation apparatus according to claim 1, further comprising:
a speed detecting means for detecting a speed of the vehicle,
wherein the navigating means is configured to increase a speed of the moving arrowhead as the detected speed of the vehicle increases.

5. The navigation apparatus according to claim 1, further comprising:
a road class distinguishing means for distinguishing a road class of a road the vehicle travels based on road class information, which is included in the acquired map information,
wherein the navigating means is configured to change a speed of the moving arrowhead based on the distinguished road class.

6. The navigation apparatus according to claim 1, further comprising:
a guidance point class distinguishing means for distinguishing a guidance point class of the predetermined guidance point based on guidance point class information, which is included in the acquired map information,
wherein the navigating means is configured to change a display configuration for the moving arrow based on the distinguished guidance point class.

7. The navigation apparatus according to claim 1, further comprising:
a re-display instruction acquiring means for acquiring a re-display instruction for demanding a re-display of the moving arrow,
wherein when the re-display instruction is acquired before the vehicle passes through the predetermined guidance point after displaying the moving arrow is completed, the navigating means is configured to re-display the moving arrow.

8. The navigation apparatus according to claim 1, wherein
if the guidance point distance is smaller than the arrow display start distance when a display of the display device is changed into the map image of the vicinity of the present position from another image other than the map image of the vicinity of the present position, the navigating means is configured to display the moving arrow.

9. The navigation apparatus according to claim 1, further comprising:
a display instruction acquiring means for acquiring an arrow display selection instruction for indicating whether to allow displaying the moving arrow; and
an arrow display prohibiting means for prohibiting the navigating means from displaying the moving arrow when the acquired instruction indicates that displaying the moving arrow is not allowed.

10. A method for navigating a vehicle, the method comprising:
displaying, based on map information, a map image of a vicinity of a present position of the vehicle and a guidance route in superimposition in a display device;
defining an end point relative to a moving arrow as being a predetermined first distance ahead of the present position along the guidance route;
defining a start point relative to the moving arrow as being a predetermined second distance smaller than the first distance ahead of the present position along the guidance route; and
superimposing, on the displayed guidance route, the moving arrow which includes an arrowhead and a line between the arrowhead and the present position, such as the arrowhead moves from the start point to the end point along the guidance route when a guidance point distance between the present position and a predetermined guidance point is smaller than a predetermined arrow display start distance.

* * * * *